United States Patent
Li et al.

(10) Patent No.: US 10,802,275 B2
(45) Date of Patent: Oct. 13, 2020

(54) HEAD-UP DISPLAY, HEAD-UP DISPLAY METHOD AND VEHICLE

(71) Applicant: BOE TECHNOLOGY GROUP CO., LTD., Beijing (CN)

(72) Inventors: Dianmeng Li, Beijing (CN); Yanjun Chen, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 164 days.

(21) Appl. No.: 16/177,016

(22) Filed: Oct. 31, 2018

(65) Prior Publication Data

US 2019/0302455 A1 Oct. 3, 2019

(30) Foreign Application Priority Data

Mar. 28, 2018 (CN) .......................... 2018 1 0269511

(51) Int. Cl.
*G02B 27/14* (2006.01)
*G09G 5/00* (2006.01)
(Continued)

(52) U.S. Cl.
CPC .......... *G02B 27/0149* (2013.01); *B60K 35/00* (2013.01); *B60R 1/00* (2013.01);
(Continued)

(58) Field of Classification Search
CPC ........ G02B 27/0149; G02B 2027/0163; B60K 35/00; B60K 2370/334; B60R 1/00; B60R 2300/205; B60W 40/076; B60W 40/103
(Continued)

(56) References Cited

U.S. PATENT DOCUMENTS

2015/0170343 A1 6/2015 Kwak
2017/0299873 A1 10/2017 Hickerson et al.
(Continued)

FOREIGN PATENT DOCUMENTS

CN          105150935 A    12/2015
CN          105974583 A    9/2016
WO    WO-2017/138242 A1    8/2017

OTHER PUBLICATIONS

Chinese Office Acton dated Feb. 3, 2020, from application No. 201810269511.1.

*Primary Examiner* — William Choi
(74) *Attorney, Agent, or Firm* — Foley & Lardner LLP (57) ABSTRACT

Arrangements of the present disclosure disclose a head-up display, a head-up display method, and a vehicle. The head-up display includes a head-up display component configured to display an image on a projection location. The display includes a master control component connected to a driving component. The master control component is configured to obtain vehicle information, analyze the vehicle information, and generate a control instruction based on an analysis result. The vehicle information includes vehicle positioning information and vehicle attitude information, or traveling road information and vehicle attitude information. The driving component, connected to the head-up display component, is configured to adjust the head-up display component based on the control instruction such that the projection location of the image displayed by the head-up display component remains at a consistent relative height with respect to the ground.

20 Claims, 5 Drawing Sheets

(51) Int. Cl.
  *G02B 27/01* (2006.01)
  *B60K 35/00* (2006.01)
  *B60R 1/00* (2006.01)
  *B60W 40/076* (2012.01)
  *B60W 40/103* (2012.01)
(52) U.S. Cl.
  CPC ........ *B60W 40/076* (2013.01); *B60W 40/103* (2013.01); *B60K 2370/334* (2019.05); *B60R 2300/205* (2013.01); *G02B 2027/0163* (2013.01)
(58) Field of Classification Search
  USPC .......................................... 359/630; 345/7, 9
  See application file for complete search history.

(56) References Cited

U.S. PATENT DOCUMENTS

2017/0371165 A1   12/2017  Lambert
2019/0011712 A1*  1/2019  Nagano .............. G02B 27/0101

* cited by examiner

HEAD-UP DISPLAY, HEAD-UP DISPLAY METHOD AND VEHICLE

CROSS-REFERENCE

This application is based upon and claims priority to Chinese Patent Application No. 201810269511.1, filed on Mar. 28, 2018, the entire contents thereof are incorporated herein by reference.

TECHNICAL FIELD

Arrangements of the present disclosure relate to the field of display technologies, and more particularly, to a head-up display, a head-up display method, and a vehicle.

BACKGROUND

A head-up display (HUD) is a vehicle-mounted vision-aided system. Its main principles are as below: vehicle state information such as vehicle velocity and fuel quantity, indication information such as navigation and road markings and information related to real sceneries on the road surface in front of the vehicle are projected at a proper location ahead of a driver, such that it is ensured that the driver's line of sight does not diverge from the road surface in front of the vehicle, a blind area caused when the driver lowers the head to see the instrument panel is eliminated, and thus driving safety is increased.

SUMMARY

Arrangements of the present disclosure relate a head-up display, a head-up display method, and a vehicle.

In a first aspect, the arrangements of the present disclosure provide a head-up display arranged in a vehicle. The head-up display includes a master control component, a driving component, and a head-up display component. The head-up display component is configured to display an image on a projection location. The master control component is connected to the driving component, and is configured to obtain vehicle information, analyze the vehicle information, and generate a control instruction based on an analysis result. The vehicle information includes vehicle positioning information and vehicle attitude information, or traveling road information and vehicle attitude information. The driving component is connected to the head-up display component and is configured to adjust the head-up display component based on the control instruction such that the projection location of the image displayed by the head-up display component remains at a consistent relative height to ground.

In an arrangement, the master control component is specifically configured to obtain road information based on the vehicle positioning information and the vehicle attitude information. The road information includes a road gradient or a gradient variation and the gradient includes slope or steepness.

In an arrangement, the master control component is specifically configured to calculate a relative height offset error of the projection location with respect to the ground based on the traveling road information and the vehicle attitude information, and calculate a deflection angle of the head-up display component based on the relative height offset error. The relative height offset error of the projection location with respect to the ground refers to a differential between the relative height of the projection location with respect to the ground and a preset threshold.

In an arrangement, the vehicle attitude information includes a vehicle inclination angle. The vehicle positioning information includes a vehicle traveling location. The traveling road information includes a direction and a distance of an object or obstacle in vehicle surrounding environment.

In an arrangement, the head-up display component includes a head-up display body, and an image generating unit, a first reflecting unit and a second reflecting unit arranged in the head-up display body. The image generating unit is configured to generate an imaging beam. The first reflecting unit is configured to reflect the imaging beam to the second reflecting unit. The second reflecting unit is configured to reflect the imaging beam to form the image displayed by the head-up display component.

In an arrangement, the first reflecting unit is any one of a plane mirror, a spatial light modulator, an acousto-optic deflector, an electro-optic deflector and a liquid crystal polarization grating.

In an arrangement, the second reflecting unit includes a free-form surface mirror or a concave reflecting mirror.

In an arrangement, the driving component is configured to adjust the first reflecting unit and/or the second reflecting unit.

In an arrangement, the driving component is configured to move the head-up display component along a first direction and/or a second direction. The first direction is parallel to a traveling direction of the vehicle, and the second direction is perpendicular to the traveling direction of the vehicle.

In a second aspect, the arrangements of the present disclosure further provide a vehicle, which includes a vehicle attitude determination device, a vehicle positioning device, and the head-up display described above. The vehicle attitude determination device is configured to capture the vehicle attitude information. The vehicle positioning device is configured to capture the vehicle positioning information or the traveling road information.

In a third aspect, the arrangements of the present disclosure further provide a head-up display method, which is applied to the above head-up display. The head-up display method includes obtaining vehicle information. The vehicle information includes: vehicle positioning information and vehicle attitude information, or traveling road information and vehicle attitude information. The method further includes analyzing the vehicle information. The method further includes generating a control instruction based on an analysis result. The method further includes adjusting the head-up display component based on the control instruction such that the projection location of the image displayed by the head-up display component remains at a consistent relative height to the ground.

In an arrangement, the analyzing the vehicle positioning information and the vehicle attitude information includes obtaining road information based on the vehicle positioning information and the vehicle attitude information. The road information includes a road gradient or a gradient variation. The gradient includes slope or steepness. The vehicle attitude information includes a vehicle inclination angle. The vehicle positioning information includes a vehicle traveling location.

In an arrangement, the analyzing the traveling road information and the vehicle attitude information includes: calculating a relative height offset error of the projection location with respect to the ground based on the traveling road information and the vehicle attitude information; and calculating a deflection angle of the head-up display component based on the relative height offset error. The relative height offset error of the projection location with respect to the ground refers to a differential between the relative height of the projection location with respect to the ground and a preset threshold. The vehicle attitude information includes a vehicle inclination angle. The traveling road information includes a direction and a distance of an object or obstacle in vehicle surrounding environment.

BRIEF DESCRIPTION OF THE DRAWINGS

The accompanying drawings are provided to further understand the technical solutions of the present disclosure and constitute a part of this specification, and, together with the arrangements of the present disclosure, are provided to interpret the technical solutions of the present disclosure, but are not intended to limit the technical solutions of the present disclosure.

DETAILED DESCRIPTION

To make the objectives, technical solutions, and advantages of the present disclosure clearer, the arrangements of the present disclosure will be described in detail below with reference to the accompanying drawings. It is to be noted that the arrangements of this application and the features in the arrangements may be arbitrarily combined with each other on a non-conflict basis.

Blocks illustrated in the flowchart of the accompanying drawings may be executed, for example, by a computer system having a set of computer-executable instructions. Furthermore, although a logic sequence is illustrated in the flowchart, in some cases, the illustrated or described blocks may be executed in a sequence different from the sequence here.

Unless otherwise defined, all the technical and scientific terms used in the arrangements of the present disclosure have the same meanings as commonly understood by one of ordinary skill in the art to which the present disclosure belongs. The terms "first," "second," etc., which are used in the arrangements of the present disclosure, are not intended to indicate any sequence, amount or importance, but distinguish various components. The terms "comprise," "comprising," or "include," "including," etc., are intended to specify that the components or the objects stated before these terms encompass the components or the objects and equivalents thereof listed after these terms, but do not preclude the other components or objects. The terms "connect" or "connection" and so on are not limited to physical or mechanical connection, and also may include electrical connection, either directly or indirectly. "On," "under," "left," "right" and the like are only used to indicate relative position relationship, and when the absolute position of the object which is described is changed, the relative position relationship may be changed accordingly.

It is found by study that the road surface is not always flat in the vehicle traveling, i.e., when the vehicle is on an uphill road or a downhill road, the relative height of the projection location of the image displayed by the HUD with respect to the ground changes, causing that the coverage region of the image displayed by the HUD is changed, which not only causes the driver's discomfort of viewing, but also is disadvantageous to safety warning, and thus cannot ensure the driver's driving safety.

Figure 1A:
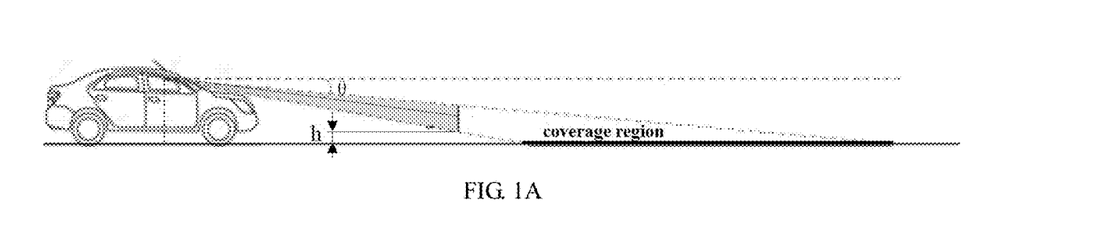
FIG. 1A is a schematic diagram of a coverage region of an existing head-up display in a flat road.
Figure 1B:
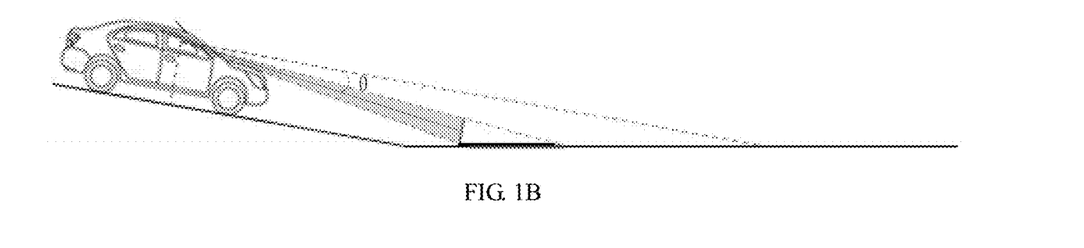
FIG. 1B is a schematic diagram of a coverage region of an existing head-up display in a downhill road.
Figure 1C:
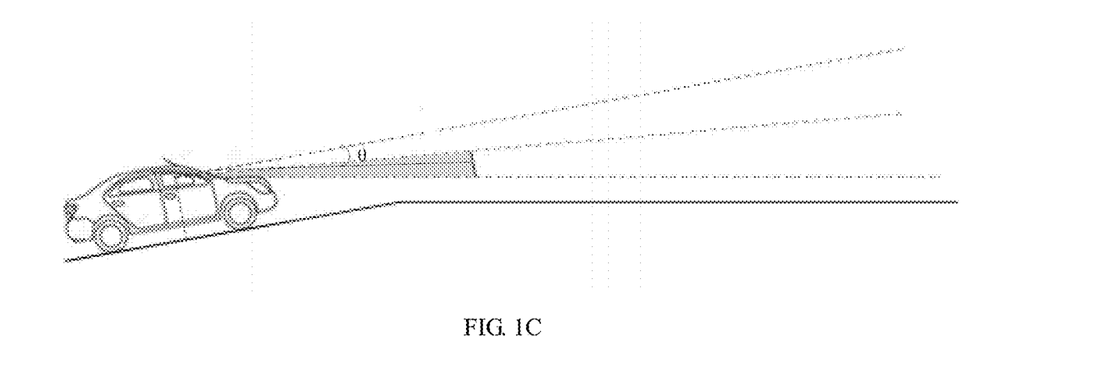
FIG. 1C is a schematic diagram of a coverage region of an existing head-up display in an uphill road.

FIG. 1A is a schematic diagram of a coverage region of an existing head-up display in a flat road. FIG. 1B is a schematic diagram of a coverage region of an existing head-up display in a downhill road. FIG. 1C is a schematic diagram of a coverage region of an existing head-up display in an uphill road. The height h represents a relative height of the projection location of the image displayed by the head-up display component with respect to the ground, and the angle θ represents a depression angle. As shown in FIG. 1A-FIG. 1C, the depression angle of the head-up display component is unchanged, and thus the relative height of the projection location of the image displayed by the head-up display component with respect to the ground (i.e., the vertical distance between the projection location of the image displayed by the head-up display component and the ground) is changed in the uphill road and the downhill road, causing the coverage region of the displayed content of the head-up display (HUD) to shift forward or shift backward, which not only causes the driver's discomfort of viewing, but also is disadvantageous to safety warning, and thus cannot ensure the driver's driving safety.

The arrangements of the present disclosure provide a head-up display, a head-up display method, and a vehicle.

Figure 2:
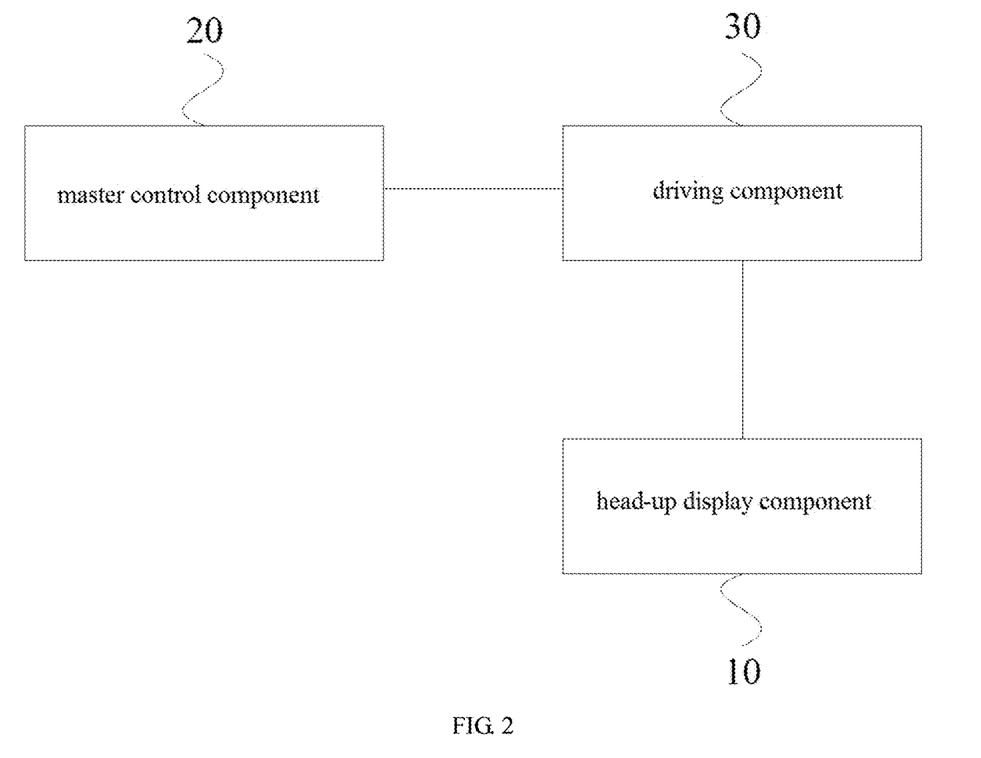
FIG. 2 is a schematic structural diagram of a head-up display according to an arrangement of the present disclosure.

FIG. 2 is a schematic structural diagram of a head-up display according to an arrangement of the present disclosure. As shown in FIG. 2, the head-up display provided by the arrangement of the present disclosure is arranged in a vehicle and includes a head-up display component 10, a master control component 20, and a driving component 30.

Specifically, the head-up display component 10 is configured to display an image on a projection location. The master control component 20 is connected to the driving component 30, and is configured to obtain vehicle information, analyze the vehicle information, and generate a control instruction based on an analysis result. The driving component 30 is connected to the head-up display component 10 and is configured to adjust the head-up display component 10 based on the control instruction such that the projection location of the image displayed by the head-up display component 10 remains at a consistent relative height relative to ground.

Specifically, the vehicle information includes: vehicle positioning information and vehicle attitude information, or traveling road information and vehicle attitude information. The relative height of the projection location of the image displayed by the head-up display component with respect to the ground specifically refers to the vertical distance between the projection location of the image displayed by the head-up display component and the ground.

In an arrangement, the vehicle positioning information includes a vehicle traveling location, which is obtained specifically via a global positioning system (GPS), a wireless network, or a vehicle-mounted camera, etc.

In an arrangement, the vehicle attitude information includes a vehicle inclination angle, which is obtained specifically via a gyroscope, an accelerometer, or a barometer, etc.

In an arrangement, the traveling road information includes a direction and a distance of an object or obstacle in vehicle surrounding environment, which are obtained specifically via a vehicle-borne radar sensor. Its principle is as below: the direction and the distance of the object or obstacle in the vehicle surrounding environment are detected by using an acoustic or laser radar, and then a three-dimensional topographic structure (including slope, distance and so on) of a road ahead is reconstructed.

Specifically, the projection location is at 5-8 meters from the driver, and the image displayed is a projected virtual image. The displayed image includes information such as navigation or road marking related to real sceneries outside the vehicle, and further includes information such as velocity, fuel quantity and short messages, etc.

The head-up display provided by the arrangement of the present disclosure is arranged in the vehicle. The head-up display includes a head-up display component, configured to display an image on a projection location. The display includes a master control component connected to a driving component. The master control component is configured to obtain vehicle information, analyze the vehicle information, and generate a control instruction based on an analysis result. The vehicle information includes vehicle positioning information and vehicle attitude information, or traveling road information and vehicle attitude information. The driving component is connected to the head-up display component and configured to adjust the head-up display component based on the control instruction such that the projection location of the image displayed by the head-up display component remains at a consistent relative height to the ground. In the technical solutions provided by the arrangement of the present disclosure, the master control component analyzes the vehicle information to control the driving component to adjust the head-up display component. Thus, the projection location of the image displayed by the head-up display component can be ensured to remain at a consistent relative height to the ground, such that a coverage region of the head-up display component remains unchanged, which not only enhances a driver's viewing comfort, but also is advantageous to safety warning, thus ensuring the driver's driving safety.

In an arrangement, the master control component 20 is specifically configured to obtain road information based on the vehicle positioning information and the vehicle attitude information. The road information includes a road gradient or a gradient variation and the gradient includes slope or steepness.

In another arrangement, the master control component 20 is configured to calculate a relative height offset error of the projection location with respect to the ground based on the traveling road information and the vehicle attitude information. The master control component 20 is configured to calculate a deflection angle of the head-up display component based on the relative height offset error. The relative height offset error of the projection location with respect to the ground refers to a differential between the relative height of the projection location with respect to the ground and a preset threshold.

Figure 3:
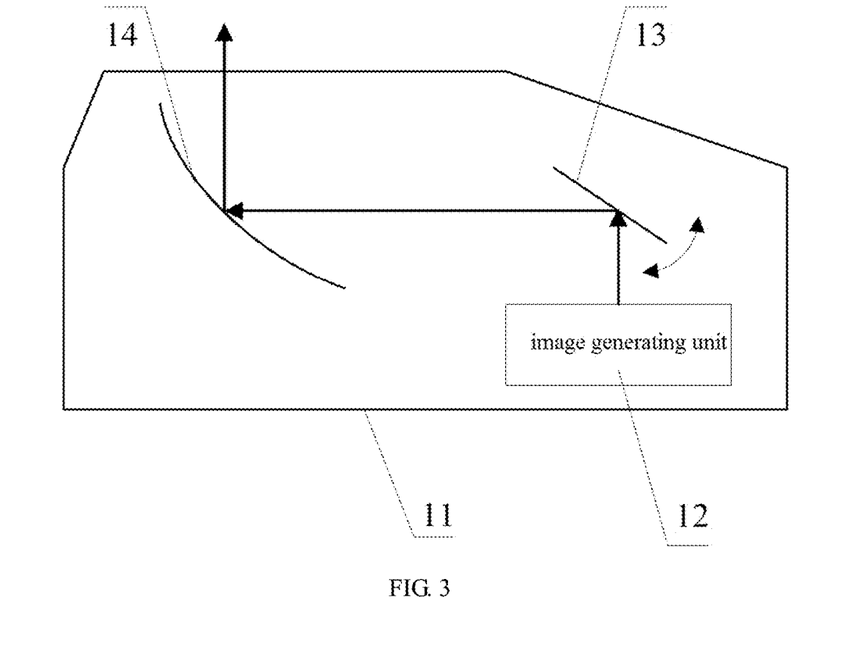
FIG. 3 is a schematic structural diagram of a head-up display component according to an arrangement of the present disclosure.

In this arrangement, FIG. 3 is a schematic structural diagram of the head-up display component according to this arrangement of the present disclosure. As shown in FIG. 3, the head-up display component provided by this arrangement of the present disclosure includes a head-up display body 11, and an image generating unit 12, a first reflecting unit 13 and a second reflecting unit 14 arranged in the head-up display body.

Specifically, the image generating unit 12 is configured to generate an imaging beam. The first reflecting unit 13 is configured to reflect the imaging beam to the second reflecting unit 14. The second reflecting unit 14 is configured to reflect the imaging beam to form the image displayed by the head-up display component.

Specifically, the second reflecting unit reflects the imaging beam to an internal surface 40 of a front windshield of the vehicle.

In an arrangement, the first reflecting unit 13 is any one of a plane mirror, a spatial light modulator, an acousto-optic deflector, an electro-optic deflector and a liquid crystal polarization grating.

In an arrangement, the second reflecting unit 14 includes a free-form surface mirror or a concave reflecting mirror.

Figure 4A:
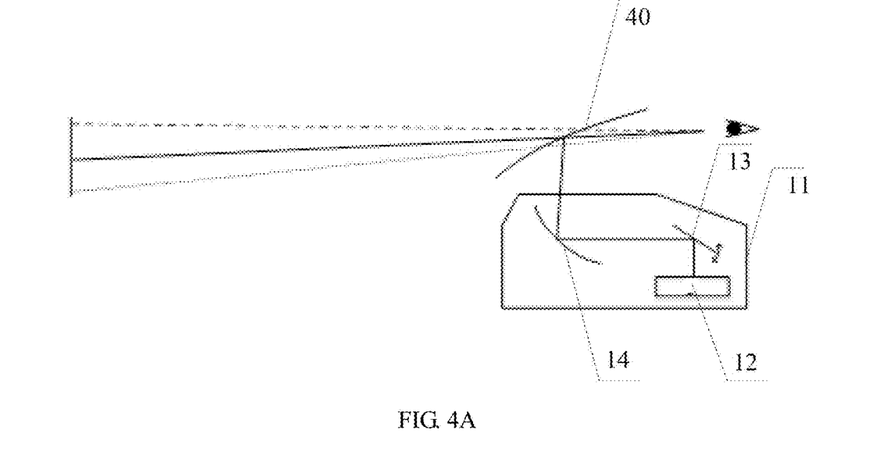
FIG. 4A is a schematic diagram of a first drive method for driving a driving component according to an arrangement of the present disclosure.

In an arrangement, FIG. 4A is a schematic diagram of a first drive method for driving the driving component according to an arrangement of the present disclosure. As shown in FIG. 4A, the driving component provided by this arrangement of the present disclosure is configured to adjust the first reflecting unit 13.

Specifically, if the first reflecting unit 13 is the plane mirror, the driving component includes an electric machine and is configured to rotate the first reflecting unit 13. If the first reflecting unit 13 is any one of the spatial light modulator, the acousto-optic deflector, the electro-optic deflector and the liquid crystal polarization grating, the driving component changes the deflecting direction of the image beam by adjusting an amplitude of a light field, etc.

Figure 4B:
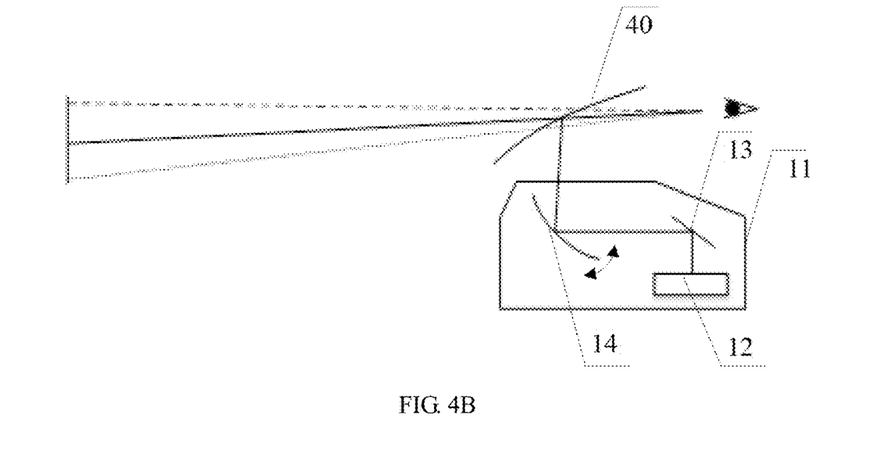
FIG. 4B is a schematic diagram of a second drive method for driving a driving component according to an arrangement of the present disclosure.

In an arrangement, FIG. 4B is a schematic diagram of a second drive method for driving a driving component according to an arrangement of the present disclosure. As shown in FIG. 4B, the driving component is configured to adjust the second reflecting unit 14.

Specifically, the driving component is configured to rotate the second reflecting unit 14.

It is to be noted that the drive methods for driving a driving component in FIG. 4A and FIG. 4B may be used for rotating the first reflecting unit or the second reflecting unit to change an emission direction of the head-up display, and also may be used for changing a location of the image beam arriving at an eye box. When a relative offset error of the displayed image is small, the image beam is within a range of the eye box, and thus the driver may see the displayed image without turning the head. When the relative offset error of the displayed image is great, it is required that the beam deflection angle for compensation offset is great, which may likely cause that the image beam is beyond the range of the eye box.

Figure 4C:
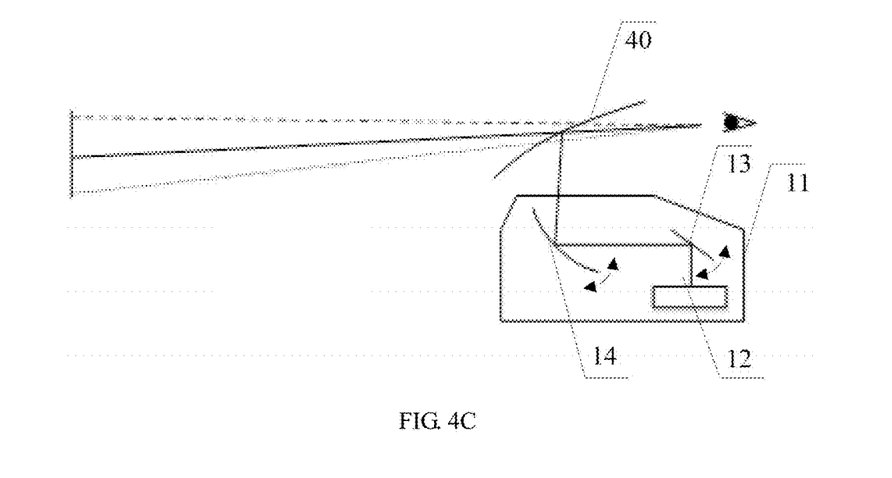
FIG. 4C is a schematic diagram of a third drive method for driving a driving component according to an arrangement of the present disclosure.

To ensure the driver can see the complete displayed image without turning the head, in an arrangement, FIG. 4C is a schematic diagram of a third drive method for driving a driving component according to an arrangement of the present disclosure. As shown in FIG. 4C, the driving component is configured to adjust the first reflecting unit 13 and further rotate the second reflecting unit 14.

Specifically, if the first reflecting unit 13 is the plane mirror, the driving component includes an electric motor and is configured to rotate the first reflecting unit 13. If the first reflecting unit 13 is any one of the spatial light modulator, the acousto-optic deflector, the electro-optic deflector and the liquid crystal polarization grating, the driving component changes the deflecting direction of the image beam by adjusting an amplitude of a light field, etc.

In this arrangement, by synchronously adjusting the first reflecting unit and the second reflecting unit in the means of double freedom rotations, it is not only ensured that the projection location of the displayed image remains at a consistent relative height with respect to the ground, but also ensured that the image beam is within the range of the eye box.

Figure 4D:
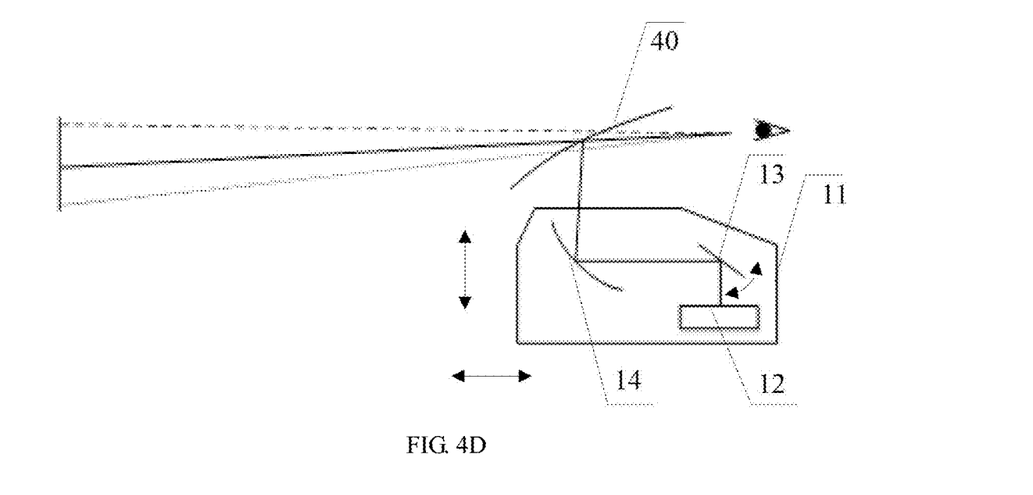
FIG. 4D is a schematic diagram of a fourth drive method for driving a driving component according to an arrangement of the present disclosure.

In an arrangement, FIG. 4D is a schematic diagram of a fourth drive method for driving the driving component according to an arrangement of the present disclosure. As shown in FIG. 4D, the driving component is configured to move the head-up display component along a first direction and/or a second direction, and is further configured to adjust the first reflecting unit 13.

The first direction is parallel to a traveling direction of the vehicle, and the second direction is perpendicular to the traveling direction of the vehicle. In an arrangement, the second direction not only is perpendicular to the traveling direction of the vehicle, but also is perpendicular to the ground.

In an arrangement, the driving component includes a mechanical motor device.

Figure 4E:
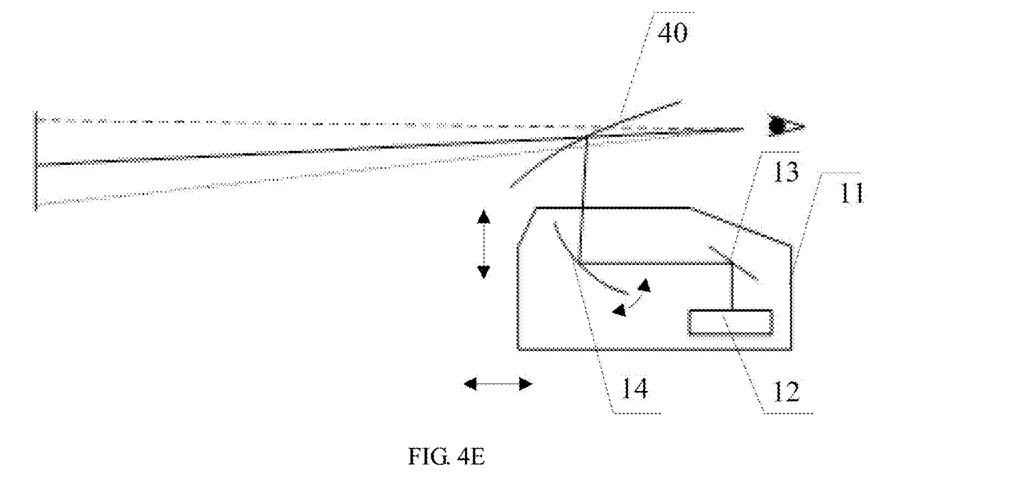
FIG. 4E is a schematic diagram of a fifth drive method for driving a driving component according to an arrangement of the present disclosure.

In an arrangement, FIG. 4E is a schematic diagram of a fifth drive method for driving a driving component according to an arrangement of the present disclosure. As shown in FIG. 4E, the driving component is configured to move the head-up display component along the first direction and/or the second direction, and is also configured to adjust the second reflecting unit.

In an arrangement, the driving component includes a mechanical motor device or an electric machine, etc.

In this arrangement, by synchronously adjusting the head-up display component and the second reflecting unit, it is ensured that the relative height of the projection location of the displayed image with respect to the ground remains unchanged.

Furthermore, the driving component provided by this arrangement of the present disclosure also may synchronously move the head-up display component, adjust the first display unit and rotate the second display unit, which not only ensures that the projection location of the displayed image remains at a consistent relative height with respect to the ground, but also ensures that the image beam is within the range of the eye box.

Figure 5:
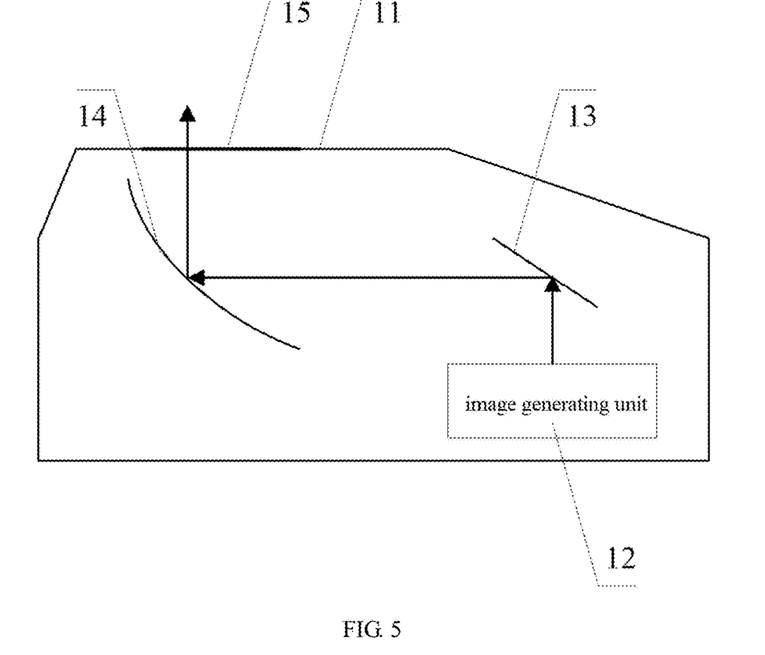
FIG. 5 is another schematic structural diagram of a head-up display component according to an arrangement of the present disclosure.

In an arrangement, FIG. 5 is another schematic structural diagram of the head-up display component according to an arrangement of the present disclosure. As shown in FIG. 5, the head-up display component provided by this arrangement of the present disclosure further includes a transparent part 15.

The transparent part 15 is positioned between the internal surface 40 of the front windshield of the vehicle and the second reflecting unit 14.

In an arrangement, the transparent part includes a cover lens which is mainly used for dust prevention and light transmission and is occasionally used for enhancing transmittance of emergent light from the head-up display by film coating, and is used for reducing stray light (such as sunlight and so on) incident upon the head-up display from outside.

Figure 6:
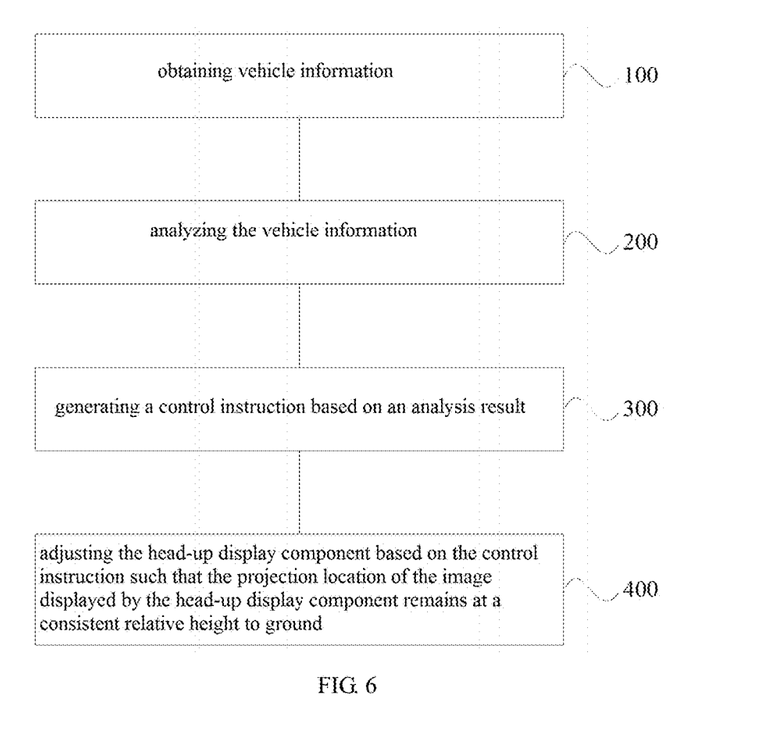
FIG. 6 is a flowchart of a head-up display method according to an arrangement of the present disclosure.

Based on the inventive concept of the foregoing arrangement, an arrangement of the present disclosure further provides a head-up display method, which is applied to the head-up display provided in the above arrangements. FIG. 6 is a flowchart of the head-up display method according to an arrangement of the present disclosure. As shown in FIG. 6, the head-up display method provided in this arrangement of the present disclosure specifically includes following blocks.

In 100, vehicle information is obtained.

Specifically, the vehicle information includes: vehicle positioning information and vehicle attitude information, or traveling road information and vehicle attitude information.

In an arrangement, the vehicle attitude information includes a vehicle inclination angle, which is obtained specifically via a gyroscope, an accelerometer, or a barometer, etc.

In an arrangement, the vehicle positioning information includes a vehicle traveling location, which is obtained specifically via a global positioning system (GPS), a wireless network, or a vehicle-mounted camera, etc.

In an arrangement, the traveling road information includes a direction and a distance of an object or obstacle in vehicle surrounding environment, which are obtained specifically via a vehicle-borne radar sensor.

In 200, the vehicle information is analyzed.

In an arrangement, if the vehicle information obtained is vehicle positioning information and vehicle attitude information, the 200 includes obtaining road information based on the vehicle positioning information and the vehicle attitude information.

Specifically, the road information includes a road gradient or a gradient variation. The gradient includes slope or steepness.

In an arrangement, if the vehicle information obtained is the traveling road information and the vehicle attitude information, the 200 includes calculating a relative height offset error of the projection location with respect to the ground based on the traveling road information and the vehicle attitude information. Block 200 includes calculating a deflection angle of the head-up display component based on the relative height offset error.

Specifically, the relative height offset error of the projection location with respect to the ground refers to a differential between the relative height of the projection location with respect to the ground and a preset threshold. The vehicle attitude information includes a vehicle inclination angle.

In 300, a control instruction is generated based on an analysis result.

In 400, the head-up display component is adjusted based on the control instruction such that the projection location of the image displayed by the head-up display component remains at a consistent relative height with respect to the ground.

The head-up display method provided by this arrangement of the present disclosure includes obtaining vehicle information. The vehicle information includes vehicle positioning information and vehicle attitude information, or traveling road information and vehicle attitude information. The method includes analyzing the vehicle information. The method includes generating a control instruction based on an analysis result. The method includes adjusting the head-up display component based on the control instruction such that the projection location of the image displayed by the head-up display component remains at a consistent relative height with respect to the ground. In the technical solutions provided by this arrangement of the present disclosure, by analyzing the vehicle information to adjust the head-up display component, it is ensured that the projection location of the image displayed by the head-up display component remains at consistent relative height with respect to the ground, such that the coverage region of the head-up display component remains unchanged, which not only enhances a driver's viewing comfort, but also is advantageous to safety warning, thus ensuring the driver's driving safety.

Based on the inventive concept of the foregoing arrangements, an arrangement of the present disclosure further provides a vehicle, which includes a vehicle attitude determination device, a vehicle positioning device, and the head-up display in the above arrangements.

The vehicle attitude determination device is configured to capture the vehicle attitude information. In an arrangement, the vehicle attitude determination device is a gyroscope, an accelerometer, or a barometer, etc.

The vehicle positioning device is configured to capture the vehicle positioning information or the traveling road information. In an arrangement, the vehicle positioning device is a global positioning system (GPS), a wireless network, a vehicle-mounted camera, or a vehicle-borne radar sensor, etc.

In this arrangement, the vehicle includes the head-up display provided in the above arrangements, having similar implementation principles and implementation effects, which are not repeated herein.

Following points need to be explained.

The accompanying drawings in the arrangements of the present disclosure are merely involved with structures involved in the arrangements of the present disclosure, and reference may be made to general design for other structures.

It is to be noted that the arrangements of the present disclosure and the features in the arrangements may be combined with each other to obtain new arrangements on a non-conflict basis.

The above are arrangements disclosed by the present disclosure. However, the described contents are merely arrangements adopted for better understanding the present disclosure rather than limiting the present disclosure. Any person skilled in the art can make any modification and variation to the implementing forms or details without departing from the spirit and scope of the present disclosure. However, the patent protection scope of the present disclosure should still be subjected to the scope defined in the appended claims.

What is claimed is:

1. A head-up display, arranged in a vehicle and comprising: a master control component, a driving component, and a head-up display component; wherein
the head-up display component is configured to display an image on a projection location;
the master control component is connected to the driving component, and is configured to obtain vehicle information, analyze the vehicle information, and generate a control instruction based on an analysis result; wherein the vehicle information comprises: vehicle attitude information and one of vehicle positioning information and traveling road information; and
the driving component is connected to the head-up display component and is configured to adjust the head-up display component based on the control instruction such that the projection location of the image displayed by the head-up display component remains at a consistent relative height with respect to ground.

2. The head-up display according to claim 1, wherein the master control component is configured to obtain road information based on the vehicle positioning information and the vehicle attitude information;
wherein the road information comprises: a road gradient or a gradient variation; and the gradient comprises slope or steepness.

3. The head-up display according to claim 1, wherein the master control component is configured to: calculate a relative height offset error of the projection location with respect to the ground based on the traveling road information and the vehicle attitude information; and calculate a deflection angle of the head-up display component based on the relative height offset error; and
wherein the relative height offset error of the projection location with respect to the ground refers to a differential between a relative height of the projection location with respect to the ground and a threshold.

4. The head-up display according to claim 1, wherein
the vehicle attitude information comprises a vehicle inclination angle;
the vehicle positioning information comprises a vehicle traveling location; and
the traveling road information comprises a direction and a distance of an object or obstacle in vehicle surrounding environment.

5. The head-up display according to claim 1, wherein the head-up display component comprises: a head-up display body, and an image generating unit, a first reflecting unit and a second reflecting unit arranged in the head-up display body; wherein
the image generating unit is configured to generate an imaging beam;
the first reflecting unit is configured to reflect the imaging beam to the second reflecting unit; and
the second reflecting unit is configured to reflect the imaging beam to form the image displayed by the head-up display component.

6. The head-up display according to claim 5, wherein the first reflecting unit is any one of a plane mirror, a spatial light modulator, an acousto-optic deflector, an electro-optic deflector and a liquid crystal polarization grating.

7. The head-up display according to claim 5, wherein the second reflecting unit comprises a free-form surface mirror or a concave reflecting mirror.

8. The head-up display according to claim 5, wherein the driving component is configured to adjust the first reflecting unit and/or the second reflecting unit.

9. The head-up display according to claim 8, wherein the driving component is configured to move the head-up display component along a first direction and/or a second direction;

wherein the first direction is parallel to a traveling direction of the vehicle, and the second direction is perpendicular to the traveling direction of the vehicle.

10. A head-up display method, applied to the head-up display according to claim 1 and comprising:
obtaining vehicle information, wherein the vehicle information comprises: vehicle attitude information and one of vehicle positioning information and traveling road information;
analyzing the vehicle information;
generating a control instruction based on an analysis result; and
adjusting the head-up display component based on the control instruction such that the projection location of the image displayed by the head-up display component remains at a consistent relative height with respect to ground.

11. The method according to claim 10, wherein the analyzing the vehicle positioning information and the vehicle attitude information comprises:
obtaining road information based on the vehicle positioning information and the vehicle attitude information;
wherein the road information comprises: a road gradient or a gradient variation, the gradient comprises slope or steepness; the vehicle attitude information comprises a vehicle inclination angle; and the vehicle positioning information comprises a vehicle traveling location.

12. The method according to claim 10, wherein the analyzing the traveling road information and the vehicle attitude information comprises:
calculating a relative height offset error of the projection location with respect to the ground based on the traveling road information and the vehicle attitude information; and calculating a deflection angle of the head-up display component based on the relative height offset error;
wherein the relative height offset error of the projection location with respect to the ground refers to a differential between a relative height of the projection location with respect to the ground and a threshold; the vehicle attitude information comprises a vehicle inclination angle; and the traveling road information comprises a direction and a distance of an object or obstacle in vehicle surrounding environment.

13. A vehicle, comprising a vehicle attitude determination device, a vehicle positioning device, and a head-up display; wherein
the vehicle attitude determination device is configured to capture vehicle attitude information;
the vehicle positioning device is configured to capture vehicle positioning information or traveling road information; and
the head-up display comprises: a master control component, a driving component, and a head-up display component,
the head-up display component is configured to display an image on a projection location;
the master control component is connected to the driving component, and is configured to obtain vehicle information, analyze the vehicle information, and generate a control instruction based on an analysis result; wherein the vehicle information comprises: the vehicle attitude information and one of the vehicle positioning information and the traveling road information; and
the driving component is connected to the head-up display component and is configured to adjust the head-up display component based on the control instruction such that the projection location of the image displayed by the head-up display component remains at a consistent relative height with respect to ground.

14. The vehicle according to claim 13, wherein the master control component is configured to obtain road information based on the vehicle positioning information and the vehicle attitude information;
wherein the road information comprises: a road gradient or a gradient variation; and the gradient comprises slope or steepness.

15. The vehicle according to claim 13, wherein the master control component is configured to: calculate a relative height offset error of the projection location with respect to the ground based on the traveling road information and the vehicle attitude information; and calculate a deflection angle of the head-up display component based on the relative height offset error; and
wherein the relative height offset error of the projection location with respect to the ground refers to a differential between a relative height of the projection location with respect to the ground and a threshold.

16. The vehicle according to claim 13, wherein
the vehicle attitude information comprises a vehicle inclination angle;
the vehicle positioning information comprises a vehicle traveling location; and
the traveling road information comprises a direction and a distance of an object or obstacle in vehicle surrounding environment.

17. The vehicle according to claim 13, wherein the head-up display component comprises: a head-up display body, and an image generating unit, a first reflecting unit and a second reflecting unit arranged in the head-up display body; wherein
the image generating unit is configured to generate an imaging beam;
the first reflecting unit is configured to reflect the imaging beam to the second reflecting unit; and
the second reflecting unit is configured to reflect the imaging beam to form the image displayed by the head-up display component.

18. The vehicle according to claim 17, wherein the first reflecting unit is any one of a plane mirror, a spatial light modulator, an acousto-optic deflector, an electro-optic deflector and a liquid crystal polarization grating.

19. The vehicle according to claim 17, wherein the second reflecting unit comprises a free-form surface mirror or a concave reflecting mirror.

20. The vehicle according to claim 17, wherein the driving component is configured to adjust the first reflecting unit and/or the second reflecting unit.

* * * * *